(12) United States Patent
Huh

(10) Patent No.: US 11,275,352 B2
(45) Date of Patent: Mar. 15, 2022

(54) SYSTEMS AND METHODS FOR AUTOMATING THE MANUFACTURE OF CUSTOMIZED PREFABRICATED PARTS USING ELECTROMAGNETIC IMAGE SURVEYING

(71) Applicant: GRUBB PROPERTIES, LLC, Charlotte, NC (US)

(72) Inventor: Dae Young Huh, San Francisco, CA (US)

(73) Assignee: GRUBB PROPERTIES, LLC, Charlotte, NC (US)

(*) Notice: Subject to any disclaimer, the term of this patent is extended or adjusted under 35 U.S.C. 154(b) by 0 days.

(21) Appl. No.: 16/714,395

(22) Filed: Dec. 13, 2019

(65) Prior Publication Data

US 2020/0241507 A1 Jul. 30, 2020

Related U.S. Application Data

(60) Provisional application No. 62/797,094, filed on Jan. 25, 2019.

(51) Int. Cl.
*G05B 19/4099* (2006.01)

(52) U.S. Cl.
CPC .............. *G05B 19/4099* (2013.01); *G05B 2219/49023* (2013.01)

(58) Field of Classification Search
CPC ...... G05B 19/4099; G05B 2219/49023; G05B 2219/35036; G01S 13/867; G01S 13/90; H01Q 15/14; G06F 30/13; G06F 30/00; Y02P 90/02; E04F 11/17; E04F 21/26; B26D 1/0006; G06T 7/49; H04W 4/02
See application file for complete search history.

(56) References Cited

U.S. PATENT DOCUMENTS

| | | | |
|---|---|---|---|
| 7,024,032 B2* | 4/2006 | Kidd | G01B 21/16 348/42 |
| 10,086,568 B2* | 10/2018 | Snyder | G05B 19/4099 |
| 10,703,419 B2* | 7/2020 | Bucknell | F16B 11/006 |
| 2018/0029132 A1* | 2/2018 | Prasannavenkatesan | B22C 9/06 |
| 2019/0204811 A1* | 7/2019 | Adair | B23K 26/1482 |
| 2020/0024849 A1* | 1/2020 | Blumer | E04F 11/09 |

* cited by examiner

*Primary Examiner* — Thomas C Lee
*Assistant Examiner* — Ameir Myers
(74) *Attorney, Agent, or Firm* — Troutman Pepper Hamilton Sanders LLP; James E. Schutz; Mark Lehi Jones

(57) ABSTRACT

A system and method for automatically manufacturing custom parts for use in a prefabricated construction site includes scanning a room under construction. The method also includes determining, based on the scan of the room, an image of an installation location in the room. The method also includes calculating, based on the image of the installation location, alteration dimensions for a prefab part. The alteration dimensions comprise alterations to the prefab part to match spatial dimensions of the installation location in the room. The method additionally includes transmitting, via a network, the alteration dimensions to a factory. The factory fabricates a custom prefab part according to the alteration dimensions.

22 Claims, 17 Drawing Sheets

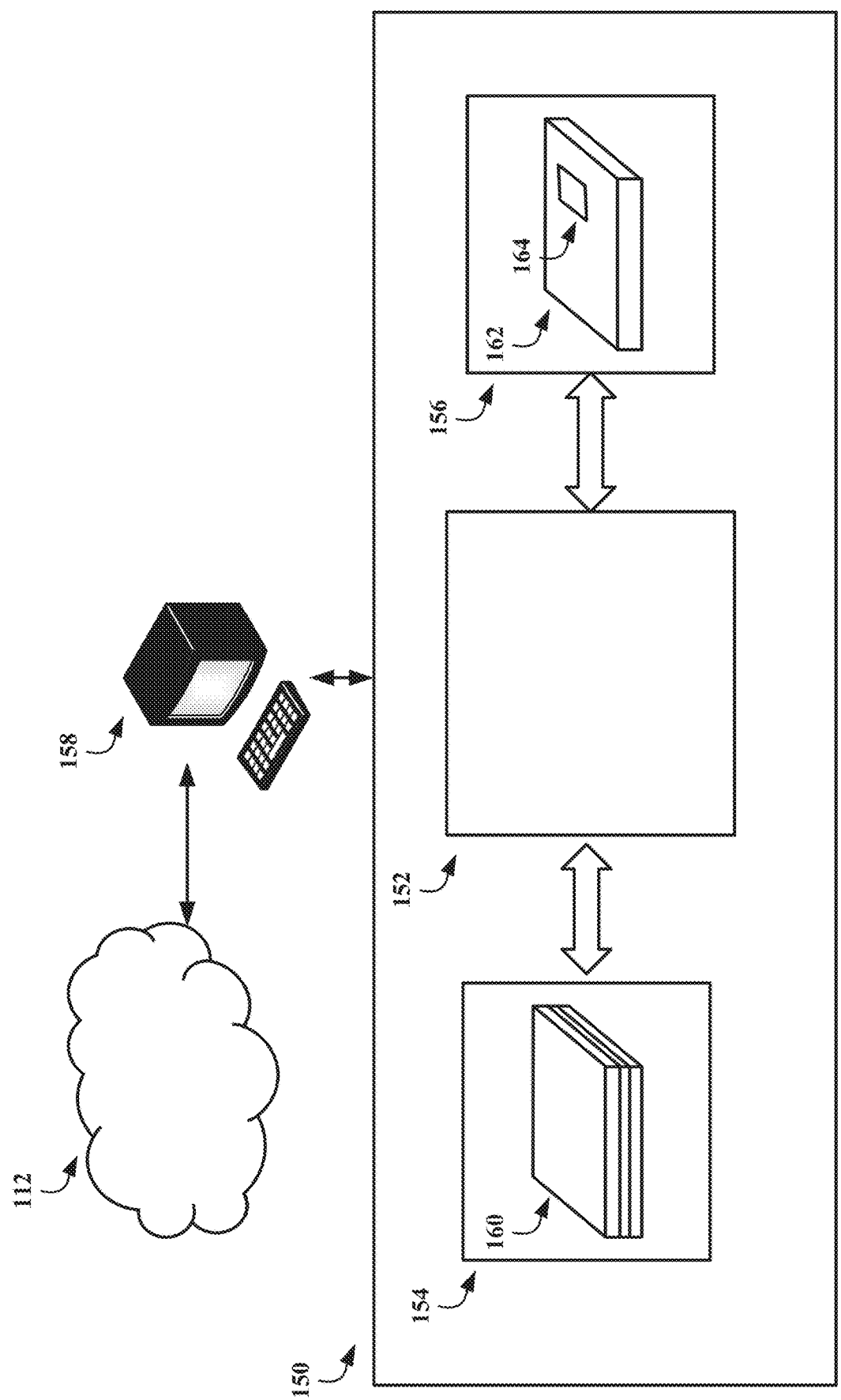

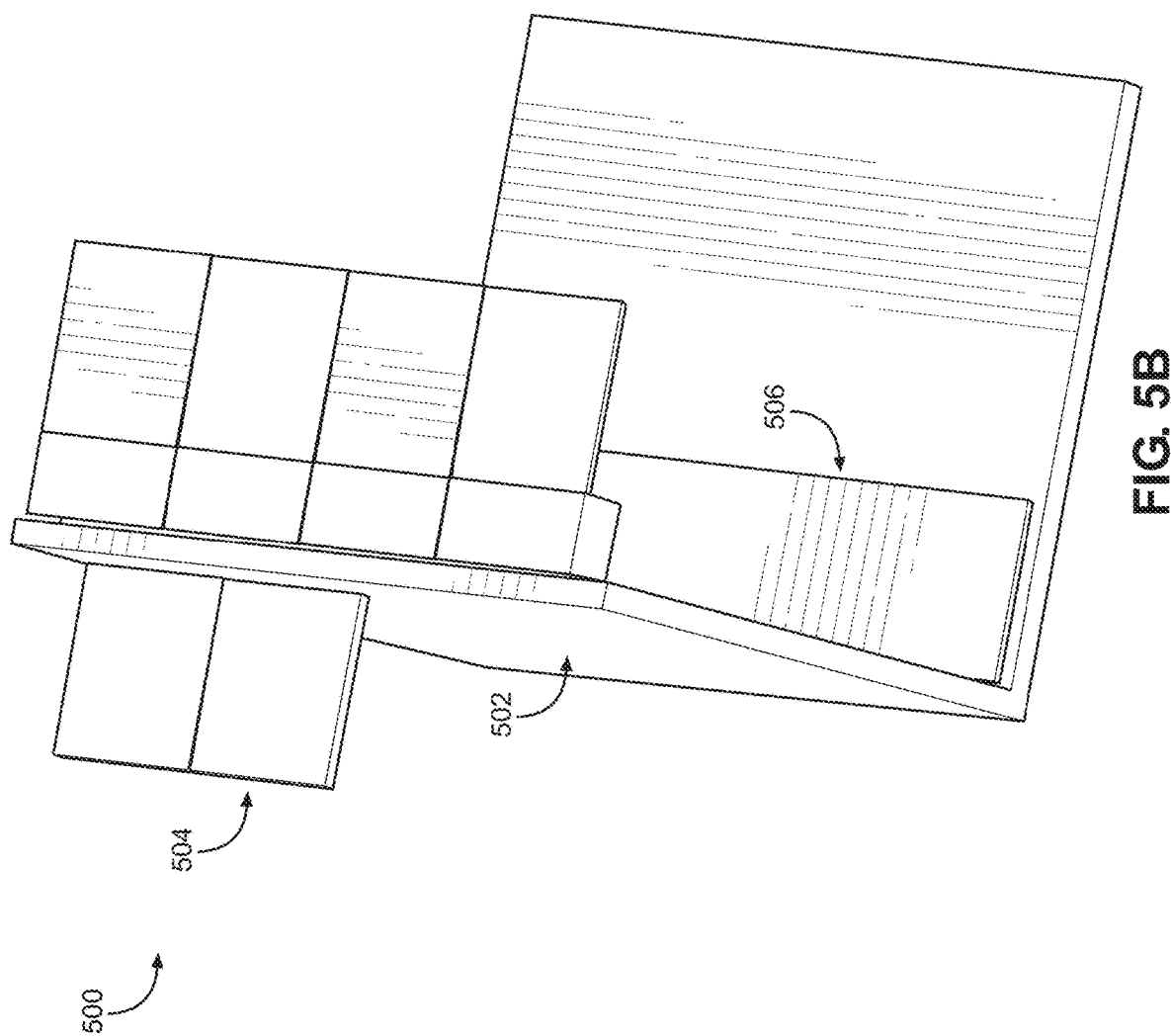

SYSTEMS AND METHODS FOR AUTOMATING THE MANUFACTURE OF CUSTOMIZED PREFABRICATED PARTS USING ELECTROMAGNETIC IMAGE SURVEYING

CROSS-REFERENCE TO RELATED APPLICATIONS

This application claims the benefit of U.S. Provisional Patent Application No. 62/797,094, filed Jan. 25, 2019, which is hereby incorporated by reference in its entirety.

FIELD

The present disclosure relates generally to methods and system for assisting in measuring and altering of components for a construction site.

BACKGROUND

Presently, at a construction site, a user positions a structural or building component by relying on a blueprint made in a design department, or by decision made on the fly at the construction site. For each component to be positioned, the user references the blueprint and then positions the component.

This conventional positioning method requires a substantial amount of time, not only for preparing the blueprints, but especially for using them on the site. Further, this method also requires that the user have experience in using blueprints. Further, under the particularly difficult conditions of a building site, the reading of the blueprints and the taking of measurements often carried out by hand are sources of errors on the exact positioning of the components and altering parts to match the requirements of the site.

SUMMARY

In some implementations, a method for automatically manufacturing custom parts for use a prefabricated construction site includes scanning a room under construction. The method also includes determining, based on the scan of the room, an image of an installation location in the room. The method also includes calculating, based on the image of the installation location, alteration dimensions for a prefab part. The alteration dimensions comprise alterations to the prefab part to match spatial dimensions of the installation location in the room. The method additionally includes transmitting, via a network, the alteration dimensions to a factory. The factory fabricates a custom prefab part according to the alteration dimensions.

Additionally, in some implementations, a system for automatically manufacturing custom parts in a prefabricated construction site one or more electromagnetic radiation sources configured to illuminate a room with electromagnetic radiation, one or more sensors configured to detect reflected components of the electromagnetic radiation that are reflected from surfaces within the room, wherein the surfaces comprise installed prefab parts, structural elements in the room, or non-structural elements such as decorative or mechanical parts, and a processing unit coupled to the one or more electromagnetic radiation sources and the one or more sensors, the processing unit executing instructions for performing a method. The method includes scanning a room under construction with the one or more electromagnetic radiation sources and the one or more sensors. The method also includes determining, based on the reflected components of the electromagnetic radiation, an image of an installation location in the room. Further, the method includes calculating, based on the image of the installation location, alteration dimensions for a prefab part. The alteration dimensions comprise alterations to the prefab part to match spatial dimensions of the installation location in the room. Additionally, the method includes transmitting, via a network, the alteration dimensions to a factory, wherein the factory fabricates a custom prefab part according to the alteration dimensions.

BRIEF DESCRIPTION OF THE DRAWINGS

The present disclosure will become better understood from the detailed description and the drawings, wherein:

FIG. 1B illustrates a block diagram of an example of a manufacturing system that can be operated in a factory and/or micro factory, according to various implementations

FIG. 5A-5D illustrate examples of several views of different types of prefab part that can be altered, according to various implementations.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Logical and structural changes can be made to the examples of the various implementations without departing from the spirit and scope of the present teachings. The following detailed description is, therefore, not to be taken in a limiting sense and the scope of the present teachings is defined by the appended claims and their equivalents.

In addition, it should be understood that steps of the examples of the methods set forth in the present disclosure can be performed in different orders than the order presented in the present disclosure. Furthermore, some steps of the examples of the methods can be performed in parallel rather than being performed sequentially. Also, the steps of the examples of the methods can be performed in a network environment in which some steps are performed by different computers in the networked environment.

Some implementations are implemented by a computer system. A computer system can include a processor, a memory, and a non-transitory computer-readable medium. The memory and non-transitory medium can store instructions for performing methods and steps described herein.

Figure 1A:
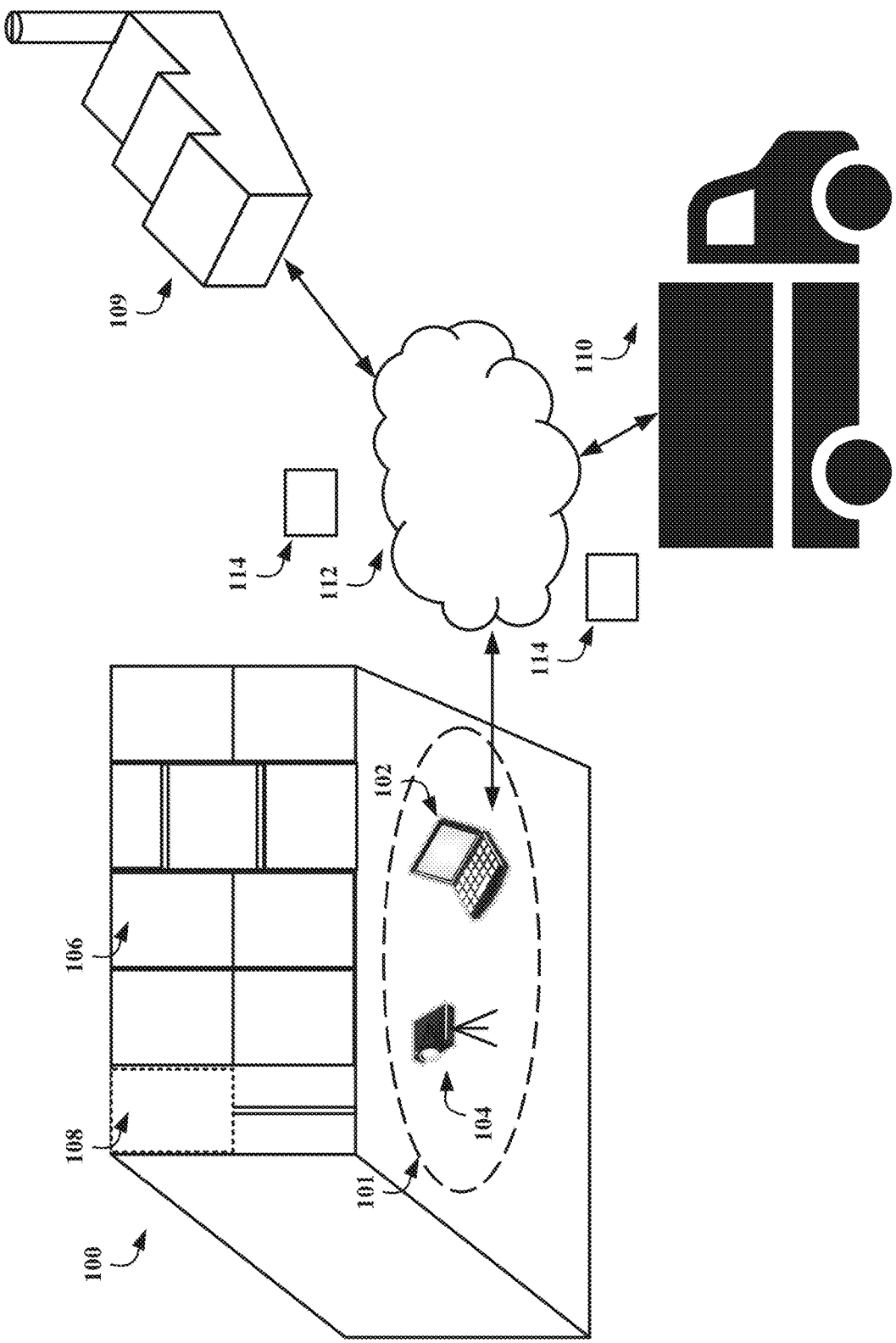
FIG. 1A illustrates a block diagram of an example of a construction site in which a custom part system, according to various implementations.

FIG. 1A is a block diagram illustrating an example of a construction site 100 in which a custom part system 101 can be used in various implementations. While FIG. 1A illustrates various components contained in the construction site 100, FIG. 1A illustrates one example of a construction site and additional components can be added and existing components can be removed.

As illustrated in FIG. 1A, the custom part system 101 includes a computer system 102 and a surveying sensor 104. The construction site 100 can be completed using prefabricated parts ("prefab parts") 106. In implementations, the prefab parts 106 can be any type of building part or material that is installed at the construction site 100. For example, the prefab parts 106 can include structural components (e.g., stubs, joists, rafters, doors and door frames, windows and window frames, etc.), facades (e.g., wall panels or coverings, flooring, ceiling panels or coverings, etc.), mechanical and electrical systems (e.g., plumbing pipes and fixtures, electrical wiring and fixtures, HVAC conduit and fixtures, etc.)

When installing the prefab parts 106, the construction site 100 may include one or more locations 108 that do not match dimensions of the prefab part 106. As such, the prefab part 106 must be altered to fit spatial dimensions of the location 108. The spatial dimension, however, may not be uniform based on the structural components and prefab parts that border the location 108, fixtures preinstalled in the location 108, and other variances encountered in the construction site 100.

In implementations, the custom part system 101 may be utilized to determine the dimensions of the alteration of the prefab part 106 to match the location 108. The custom part system 101 can be configured to utilize the surveying sensor 104 to generate a three dimension (3D) representation of the location 108. The custom part system 101 can be configured to utilize the computer system 102 to analyze the 3D representation of the location 108 to determine the spatial dimensions of the location 108. Based on the spatial dimensions, the custom part system 101 can be configured to utilize the computer system 102 to calculate alterations to the prefab part 106 to match the spatial dimensions of the location 108. Once calculated, the custom part system 101 can be configured to utilize the computer system 102 to generate a specification 114 that specifies the alterations to be made to a prefab part 106. Then, the custom part system 101 can be configured to utilize the computer system 102 to transmit the specification 114 to a factory 109 and/or a micro factory 110 via one or more networks 112.

The factory 109 and/or the micro factory 110 include one or more manufacturing systems to perform alterations to a prefab part 106 according to the specification 114, as discussed below. In some implementations, the factory 109 can be a fixed shop or manufacturing location that performs alterations to prefab parts. The micro factory 110 can be a mobile shop that includes the manufacturing systems and is mobile to move between construction sites.

The computer system 102 can be any type of computer system capable of communicating with and interacting with the survey sensor 104 and performing the process and methods described herein. As described herein, the computer system 102 can include any of a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise).

In implementations, one or more of the components of the computer system 102 and the surveying sensor 104 can be implemented as software programs or modules that perform the methods, process, and protocols described herein. The software programs or modules can be written in a variety of programming languages, such as JAVA, C++, Python code, Visual Basic, hypertext markup language (HTML), extensible markup language (XML), and the like to accommodate a variety of operating systems, computing system architectures, etc.

The surveying sensor 104 can be configured to scan the location 108 and generate a 3D representation of the location 108. In some implementations, the surveying sensor 104 can include one or more electromagnetic radiation sources and one or more electromagnetic radiation sensors. The surveying sensor 104 can be configured to illuminate the location 108 with electromagnetic radiation and detect components of the electromagnetic radiation reflected back to the one or more electromagnetic radiation sensors. Based on the reflected components, the surveying sensor 104 (in coordination with the computer system 102) can be configured to generate the 3D representation of the location 108.

For example, the surveying sensor 104 can be configured to utilize LiDAR surveying techniques to generate the 3D representation of the location 108. LiDAR is a surveying method that measures distance to a target by illuminating the target with pulsed laser light and measuring the reflected pulses with a sensor. Differences in laser return times and wavelengths can then be used to make digital 3D representations of the target. The LiDAR surveying sensor can utilize different types of electromagnetic radiation. For instance, the surveying sensor 104 can utilize ultraviolet, visible, or near infrared light to image the location 108. In LiDAR, light can be reflected via backscattering, as opposed to pure reflection. The surveying sensor 104 can utilize different types of scattering used for LiDAR surveying techniques, such as Rayleigh scattering, Mie scattering, Raman scattering, and fluorescence. The surveying sensor 104 can utilize two kinds of LiDAR detection schemes: "incoherent" or direct energy detection (e.g., measurement of amplitude changes of the reflected light) and "coherent" detection (e.g., measurement of changes in phase of the reflected light).

In implementations, once the 3D representation of the location 108 is generated, the computer system 102 can be configured to perform image analysis algorithms or techniques to identify the special dimensions of the location 108. That is, the computer system 102 can be configured to identify the features and objects (e.g., installed prefab panels, structural components, etc.) in the 3D representation and, based on the features and objects, calculate spatial dimensions of a space defined by the features and objects.

In some implementations, the computer system 102 can utilize feature detection algorithms and techniques to identify the feature and objects in the 3D representation. Feature detection includes methods for computing abstractions of image information and making local decisions at every image point whether there is an image feature of a given type at that point or not. The resulting features will be subsets of the image domain, often in the form of isolated points, continuous curves or connected region. For example, the computer system 102 can be configured to utilize edge and corner detection techniques to identify the features and objects (e.g., installed prefab panels, structural components, non-structural decorative or mechanical parts, etc.) in the 3D representation. Edge detection include mathematical methods that identify points in a digital image at which the image brightness changes sharply or, more formally, has discontinuities. The points at which image brightness changes sharply are typically organized into a set of curved line segments termed edges. Based on the detected edges, the corners in the image can be identified. Likewise, for example, the computer system 102 can utilize algorithms and techniques such as region of interest detection, ridge detection, etc.

Once the features and objects in the 3D representation have be identified, the computer system 102 can be configured to calculate spatial dimensions defined by the features and objects at the location 108. For example, the computer system 102 can generate virtual lines between the features and objects and estimate the distance between the features and objects. Once the distances have been calculated, the computer system 102 can be configured to generate the specification 114 that defines alterations to be made to a prefab part 106 so that the prefab part 106 fits the spatial dimensions defined by the feature and objects at the location 108. In some implementations, the specification 114 includes a three dimensional schematic of a prefab part 106 altered to match spatial dimensions defined by the feature and objects at the location 108. For example, the specification 114 can be a computer-aided design ("CAD") model that provides a design outline for the altered prefab part 106. The specification 114 can also include additional information such as a type of the prefab part 106, an installation order in an installation plan, details of the custom part system 101, details of a user operating the custom part system 101, etc.

Once the specification is generated, the computer system 102 can be configured to transmit the specification 114 to the factory 109 and/or the micro factory 110 via the one or more networks 112. The one or more networks 112 can include local area networks (LANs), wide area networks (WANs), telephone networks, such as the Public Switched Telephone Network (PSTN), an intranet, the Internet, or a combinations thereof. It should be understood that where the terms server or computer system are used, this includes the use of networked arrangements of multiple devices operating as a server or computer system. For example, distributed or parallel computing can be used.

In some implementations, the prefab parts 106 (e.g., prefab panels) can be installed from the center of the construction site 100 to the edges of the construction site 100. The location 108, which requires the custom prefab panel, can be located at the edge of the construction site 100, e.g., at a termination of a wall or other structural element or a connection between one wall and another wall or structural element. As such, the location 108 can define a space of limited size, for example, approximately the width of a prefab part 106. The space of limited size may also be other sizes like half the size of a prefab part 106 or twice the size of prefab part 106. In the example using LiDAR, the surveying sensor 104 can have an expected deviation in measurement from the actual spatial dimensions of the location 108 of approximately +/−1.00%. For a construction site 100 of 10 feet, the expected deviation can results in a deviation of 1.2 inches if the entire construction site 100 is scanned. Because the installation process reduces the location 108 to a defined space (e.g., approximately the width of a prefab part 106), the expected deviation in the measurements with the surveying sensor 104 can be reduced to approximately $\frac{1}{37}$ inch. Thus, in one example, to build a wall with prefab parts 106 (e.g., prefab panels) may include two prefab parts 106 at the edges of the wall where the wall terminates and additional center prefab parts 106 that are not at either edge of the wall. The center prefab parts 106 may be placed first because they link directly with other prefab parts 106 in a calculated manner so that they will not need alteration. The prefab parts 106 at the edges may require alteration due to interfacing perpendicularly, or not planarly, with other prefab parts 106 or other structural elements. The locations 108 at the edges of the wall may be measured with LiDAR or other method of electromagnetic radiation. By measuring locations 108 that are smaller than the entire wall, the measurement error is reduced.

Additionally, an electromagnetic radiation source such as LiDAR may measure a plurality of points. For example, the surveying sensor 104 can collect approximately 2-5 data points spread from the top to bottom of structural features (e.g., walls) and installed prefab parts, and still maintain a low deviation in the measurements. Additionally, by collecting multiple points along the structural features (e.g., walls) and installed prefab parts, the curvature of the structural features and installed prefab parts can be accurately detected. By identifying the curvature of structural features and installed prefab parts, the alterations to a prefab part 106 need not be linear but can be curved, jagged, or any other shape. In some embodiments, a large plurality of points such as dozens, hundreds, or thousands is measured by the surveying sensor 104.

FIG. 1B illustrates an example of a manufacturing system 150 that can be operated in the factory 109 and/or micro-factory 110, according to various implementations. While FIG. 1B illustrates various components contained in the manufacturing system 150, FIG. 1A illustrates one example of a manufacturing system and additional components can be added and existing components can be removed.

As illustrated in FIG. 1B, the manufacturing system 150 includes a computer numeral control ("CNC") tool 152, an autoloader 154, and a labeler 156. The CNC tool 152 includes a machining tool (e.g., drill, boring tool, lathe, saw, three-dimensional (3D) printer, plasma cutter, mill, electric discharge machining or cutting tool, water cutting jet, etc.) that is automated through the use of a computer system 158. While FIG. 1B illustrates the computer system 158 as being a separate system, in various implementations, the computer system 158 can be integrated in the manufacturing system 150 and/or the CNC tool 152. Likewise, the manufacturing system 150 and/or the CNC tool 152 can include a separate computer system that communicates with the computer system 158. As described elsewhere herein, the manufacturing system 150 may alternatively or additionally include additive manufacturing tools, such as a 3D printer, to alter the prefab part 106 to fit location 108. Additive tools may be used to add a spacer or shim to a part. In one embodiment, an additive or depositing process may be used to add material on an existing part of a prefab part 106 to create a spacer or shim.

The CNC tool 152 can be configured to perform alterations on one or more prefab parts 160 according to the specifications 114 transmitted from the custom part system 101. The CNC tool 152 can include a motorized maneuverable tool and a motorized maneuverable platform, which are both controlled by the computer system 158 (or other computer system), according to the specification 114. In some implementations, the specification 114 can be transformed into a sequential program of machine control instructions, and then executed by the CNC tool 152.

The manufacturing system 150 can also include the autoloader 154. The autoloader 154 can be loaded with a stack of prefab parts 160. When instructions are received to alter a prefab parts 160, the autoloader 154 can be configured to automatically retrieve one of the prefab parts 160 and feed the prefab part 160 to the CNC tool 152. While FIG. 1B illustrates the autoloader 154 being loaded with one type of prefab part 160, the autoloader 154 can be configured to be loaded with different types of prefab parts. In some implementations, the specification 114 can include an identification of the type of prefab part to be altered. The computer system 158 can be configured to instruct the autoloader 154 to select the appropriate type of prefab part according to the specification 114 and feed the prefab part to the CNC tool 152. In some implementations, when the CNC tool 152 is a tool that creates prefab parts (e.g., 3D printer), the autoloader 154 can be configured to store raw materials used by the CNC tool 152.

The manufacturing system 150 can also include the labeler 156. The labeler 156 can be configured to label the prefab part 162 that has been altered by the CNC tool 152 with a visual indicator 164. The visual indicator 164 can include a machine-readable label that encodes information on the prefab part 162 that has been altered, such as an order position in the installation order, the type of the prefab part, the alterations made to the prefab part 162, etc. In some implementations, the machine-readable label 116 can include a barcode, a quick response ("QR") code, a radio frequency identifier ("RFID"), etc. The visual indicator 164 can also include text labels that provide a human-readable version of the information encoded in the machine-readable label. The visual indicator 164 can be utilized to identify the prefab part 162 and assist in the installation, for example, as discussed in U.S. Provisional Application No. 62/797,094, entitled "Systems and Methods for Automating Installation of Prefabricated Parts Using Projected Installation Graphics" to Huh and filed on the same day as the instant application, the entire contents of which are incorporated herein by reference.

The computer system 158 can be any type of computer system capable of communicating with and interacting with the manufacturing system 150 and performing the process and methods described herein. As described herein, the computer system 158 can include any of a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise).

In implementations, one or more of the components of the computer system 158 and the manufacturing system 150 can be implemented as software programs or modules that perform the methods, process, and protocols described herein. The software programs or modules can be written in a variety of programming languages, such as JAVA, C++, Python code, Visual Basic, hypertext markup language (HTML), extensible markup language (XML), and the like to accommodate a variety of operating systems, computing system architectures, etc.

Figure 2:
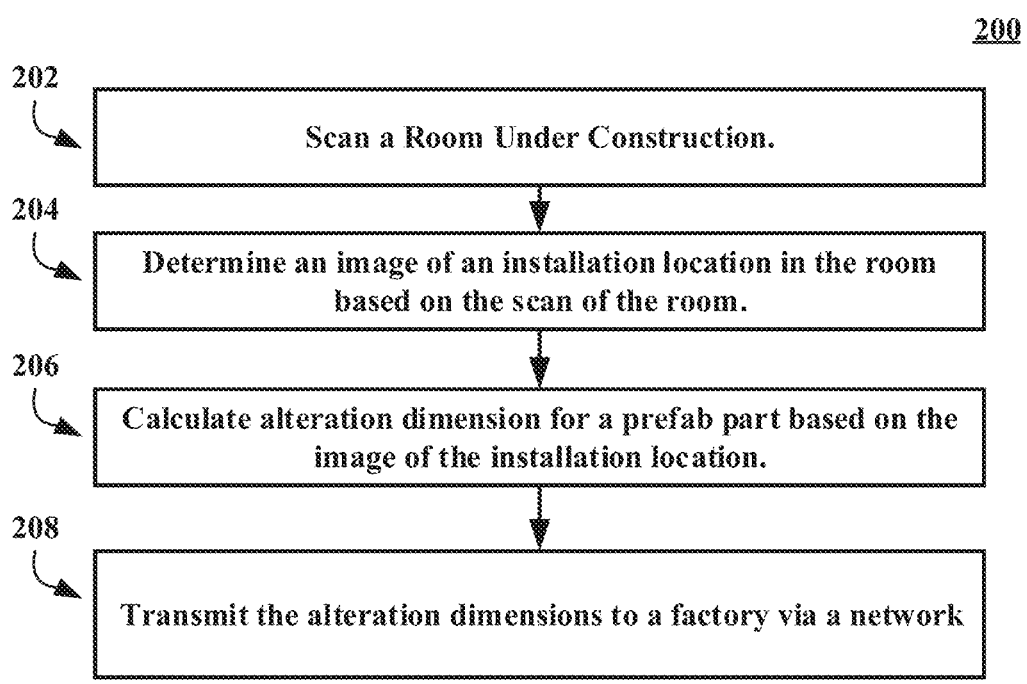
FIG. 2 illustrates an example of a method for automatically manufacturing custom parts for use a prefabricated construction site, according to various implementations.

FIG. 2 illustrates an example of a method 200 for automatically manufacturing custom parts for use a prefabricated construction site, according to various implementations. While FIG. 2 illustrates various stages that can be performed, stages can be removed and additional stages can be added. Likewise, the order of the illustrated stages can be performed in any order.

In 202, a room under construction is scanned. In some implementations, a location in the room can be scanned that requires alterations of a prefab part. In some implementations, the room can be scanned to determine the location. In some implementations, multiple locations in the room can be scanned and the alterations needed to a plurality of parts may be calculated at once. In doing so, the necessary alterations may be spread across a plurality parts so that smaller changes are needed to each part, rather than having large changes to a single part or smaller number of parts. The alterations may be spread approximately evenly across the plurality of parts. Thus, the computer system 102 may generate specifications 114 for the plurality of parts at once and distribute the alterations across the specifications 114 so that the alterations made to each prefab part are smaller. This may create a more visually appealing room with more uniform parts. When the locations are in different places in the room, more than one scan of the room may be used to scan the locations or determine the locations.

For example, referring to FIG. 1A, the custom part system 101 can utilize the surveying sensor 104 to generate a three dimension (3D) representation of the location 108. The surveying sensor 104, under the instruction of the computer system 102 can scan the location 108 and generate a 3D representation of the location 108. The surveying sensor 104 can illuminate the location 108 with electromagnetic radiation from one or more electromagnetic radiation sources and detect components of the electromagnetic radiation reflected back to the one or more electromagnetic radiation sensors.

In 204, an image of an installation location in the room is determined. In some implementations, the image of the installation location can be a 3D representation of the installation location with includes the features and objects (e.g., installed prefab panels, structural components, etc.) at the location.

For example, referring to FIG. 1A, the surveying sensor 104 can detect components of the electromagnetic radiation reflected back to the one or more electromagnetic radiation sensors. Based on the reflected components, the surveying sensor 104 (in coordination with the computer system 102) can generate the 3D representation of the location 108.

In 206, alteration dimensions for a prefab panel are calculated. In some implementations, the alteration dimensions can include a three dimensional schematic of a prefab part altered to match spatial dimensions defined by the feature and objects at the installation location. In some implementations, the alteration dimensions can include a computer-aided design ("CAD") model that provides a design outline for the altered prefab part. In some implementations, the alteration dimensions can also include additional information such as a type of the prefab part, an installation order in an installation plan, details of the custom part system, details of a user operating the custom part system, etc.

For example, referring to FIG. 1A, once the features and objects in the 3D representation have be identified, the computer system 102 can calculate spatial dimensions defined by the features and objects at the location 108. For instance, the computer system 102 can generate virtual lines between the features and objects and estimate the distance between the features and objects. Once the distances have be calculated, the computer system 102 can generate the specification 114 that defines alterations to be made to a prefab part 106 so that the prefab part 106 fits the spatial dimensions defined by the feature and objects at the location 108.

In 208, the alteration dimension are transmitted to a factory via a network. In some implementations, the factory can be a fixed location factory. In some implementations, the factory can be a micro factory.

For example, as illustrated in FIG. 1A, the custom part system 101 can utilize the computer system 102 to transmit the specification 114 to a factory 109 and/or a micro factory 110 via the one or more networks 112. The factory 109 and/or the micro factory 110 include one or more manufacturing systems to perform alterations to a prefab part 106 according to the specification 114, as illustrated in FIG. 1B.

Figure 3A:
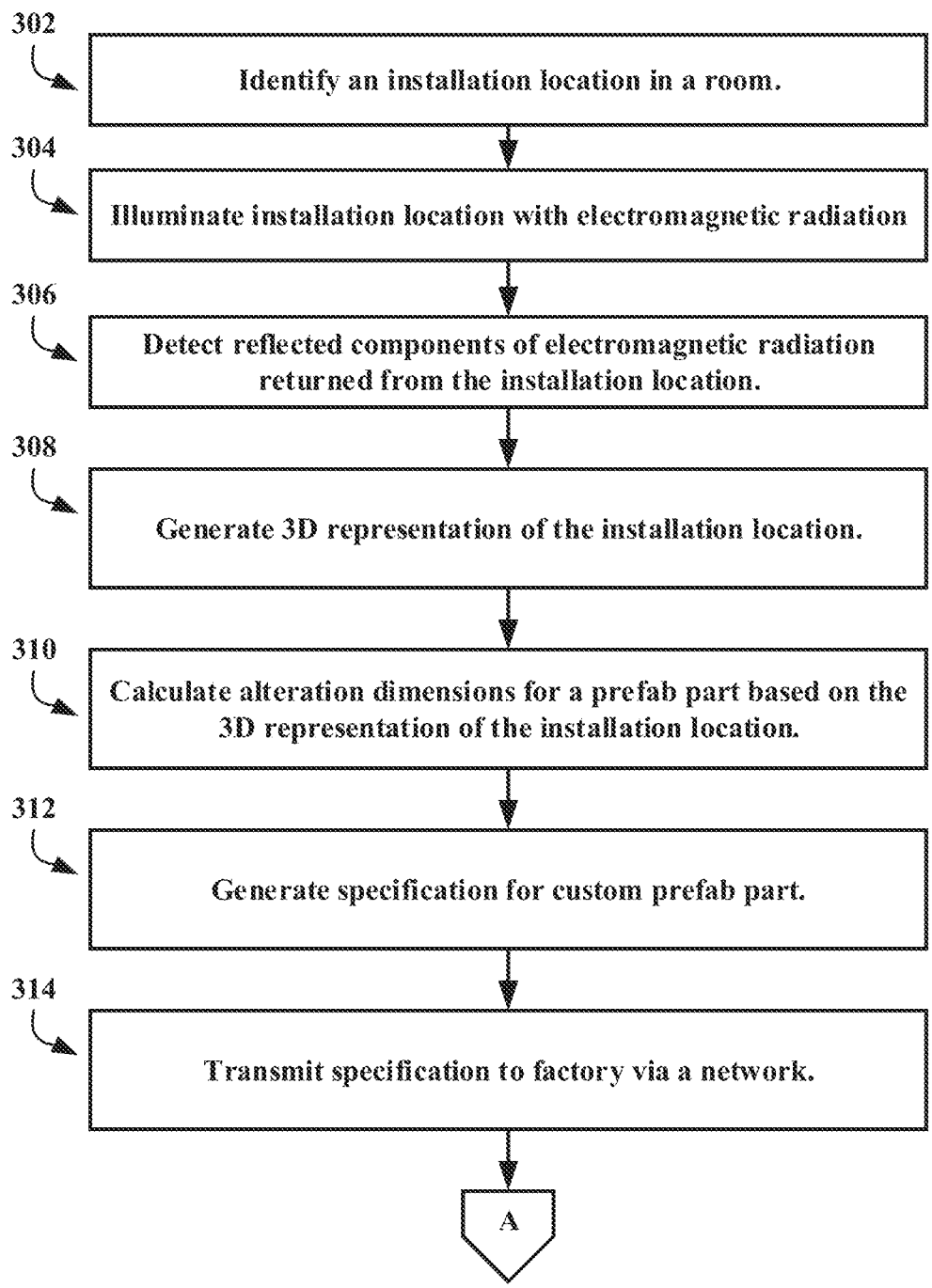
FIGS. 3A and 3B illustrate another example of a method for automatically manufacturing custom parts for use a prefabricated construction site, according to various implementations.
Figure 3B:
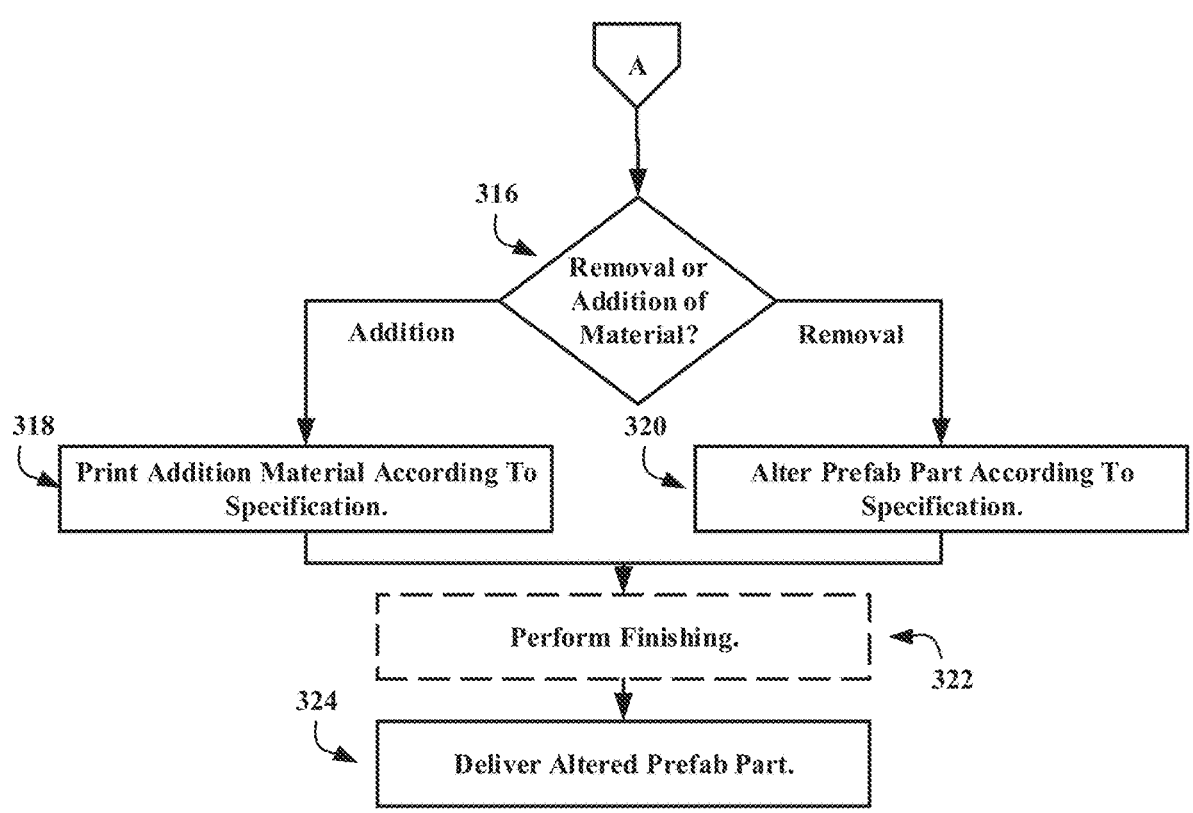

FIGS. 3A and 3B illustrate an example of a method 300 for automatically manufacturing custom parts for use a prefabricated construction site, according to various implementations. While FIGS. 3A and 3B illustrates various stages that can be performed, stages can be removed and additional stages can be added. Likewise, the order of the illustrated stages can be performed in any order.

In 302, an installation location in a room is identified. In some implementations, a user can identify an installation location that requires a custom prefab part. In some implementations, the custom part system can identify the installation location. In some implementations, other system can be used to identify the installation location. For example, the installation location can be identified by an installation assistance system as discussed in U.S. Provisional Application No. 62/797,094, entitled "Systems and Methods for Automating Installation of Prefabricated Parts Using Projected Installation Graphics" to Huh and filed on the same day as the instant application, the entire contents of which are incorporated herein by reference.

In 304, the installation location is illuminated with electromagnetic radiation. In some implementations, the installation location can be illuminated with light.

For example, referring to FIG. 1A, the custom part system 101 can utilize the surveying sensor 104 to generate a three dimension (3D) representation of the location 108. The surveying sensor 104, under the instruction of the computer system 102 can scan the location 108 and generate a 3D representation of the location 108. The surveying sensor 104 can illuminate the location 108 with electromagnetic radiation from one or more electromagnetic radiation sources and detect components of the electromagnetic radiation reflected back to the one or more electromagnetic radiation sensors.

For instance, the surveying sensor 104 can be configured to utilize LiDAR surveying techniques. In LiDAR, the surveying sensor can illuminate the location 108 with light, for example, light from a pulsed laser. The surveying sensor 104 can utilize ultraviolet, visible, or near infrared light to image the location 108.

In 306, reflected components of the electromagnetic radiation returned from the installation location are detected. In some implementations, backscattered radiation can be detected. In some implementations, direct reflection can be detected.

For example, referring to FIG. 1A, the surveying sensor 104 can measure distance to a target (objects and features at the location 108) by illuminating the target with pulsed laser light and measuring the reflected pulses with a sensor. In LiDAR, light can be reflected via backscattering, as opposed to pure reflection. The surveying sensor 104 can utilize different types of scattering used for LiDAR surveying techniques, such as Rayleigh scattering, Mie scattering, Raman scattering, and fluorescence. The surveying sensor 104 can utilize two kinds of LiDAR detection schemes: "incoherent" or direct energy detection (e.g., measurement of amplitude changes of the reflected light) and "coherent" detection (e.g., measurement of changes in phase of the reflected light).

In 308, a 3D representation of the installation is generated. In some implementations, a 3D representation can include the features and objects (e.g., installed prefab panels, structural components, etc.) at the location.

For example, referring to FIG. 1A, the surveying sensor 104 can detect components of the electromagnetic radiation reflected back to the one or more electromagnetic radiation sensors. Based on the reflected components, the surveying sensor 104 (in coordination with the computer system 102) can generate the 3D representation of the location 108. For instance, differences in laser return times and wavelengths can then be used to make digital 3D representations of the target.

The LiDAR method has an uncertainty of +/−1%. As such, for measuring a single prefab part (e.g., prefab panel), the custom part system can determine the spatial dimensions of the location 108 with $1/37^{th}$ of an inch.

In 310, alteration dimensions for a prefab part are calculated based on the 3D representation of the installation location. In some implementations, the alteration dimensions can include a three dimensional schematic of a prefab part altered to match spatial dimensions defined by the feature and objects at the installation location. In some implementations, the alteration dimensions can include a computer-aided design ("CAD") model that provides a design outline for the altered prefab part. In some implementations, the alteration dimensions can also include additional information such as a type of the prefab part, an installation order in an installation plan, details of the custom part system, details of a user operating the custom part system, etc.

For example, referring to FIG. 1A, once the features and objects in the 3D representation have be identified, the computer system 102 can calculate spatial dimensions defined by the features and objects at the location 108. For instance, the computer system 102 can generate virtual lines between the features and objects and estimate the distance between the features and objects. Once the distances have be calculated, the computer system 102 can generate the specification 114 that defines alterations to be made to a prefab part 106 so that the prefab part 106 fits the spatial dimensions defined by the feature and objects at the location 108.

Figure 4:
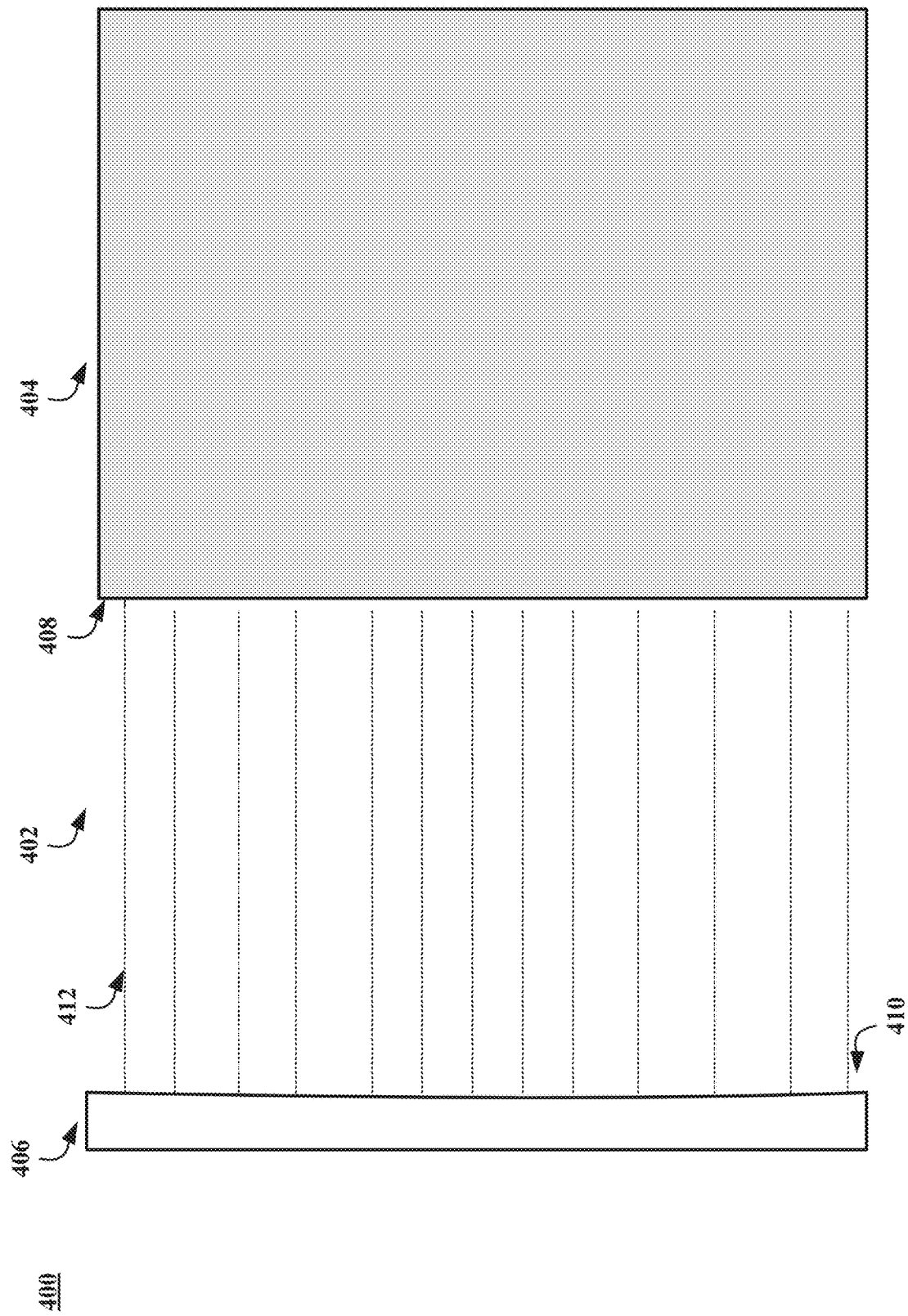
FIG. 4 illustrates an example of a representation of an installation location, according to various implementations.

For example, as illustrated in FIG. 4, a representation 400, generated using LiDAR, may comprise an image of an installation location 402. While FIG. 4 illustrates the representation as two dimensional, one skilled in the art will realize the method describe can equally apply to a 3D representation. As illustrated, the installation location 402 can be positioned between a prefab panel 404 and a structural element 406. To identify the space, the computer system 102 can perform feature recognition to identify an edge 408 of the prefab panel 404 that borders the installation location 402 and to identify an edge 410 of the structural element 406 that borders the installation location 402. To determine the dimensions, the computer system 102 can generate virtual measurement lines 412 in the representation 400. The computer system 102 can then calculate the measurement of the virtual measurement line 412 to determine the dimensions of the location 402. Because the edge 408 or edge 410 may not be uniform, the computer system 102 can generate enough virtual measurement line 412 to approximate the curve of the edge 408 and edge 410.

In 312, a specification is generated for a custom prefab part. In some implementations, the specification can include a three dimensional schematic of a prefab part altered to match spatial dimensions defined by the feature and objects at the installation location. In some implementations, the specification can include a computer-aided design ("CAD") model that provides a design outline for the altered prefab part. In some implementations, the specification can also include additional information such as a type of the prefab part, an installation order in an installation plan, details of the custom part system, details of a user operating the custom part system, etc.

In 314, the specification is transmitted to a factory via a network. In some implementations, the factory can be a fixed location factory. In some implementations, the factory can be a micro factory.

For example, as illustrated in FIG. 1A, the custom part system 101 can utilize the computer system 102 to transmit the specification 114 to a factory 109 and/or a micro factory 110 via the one or more networks 112. The factory 109 and/or the micro factory 110 include one or more manufacturing systems to perform alterations to a prefab part 106 according to the specification 114, as illustrated in FIG. 1B.

In 316, it is determined whether material is removed or added. In some implementations, an existing prefab part can be altered to remove material and reduce size. In some implementations, additional material can be added to a prefab part.

For example, referring to FIG. 1B, the computer system 158 can receive the specification 114 and determine whether material is added or removed. As such, the computer system 158 can select the CNC tool 152 based on whether material is removed or added and based on the type of prefab part being altered.

If material is added, in 318, an addition is printed according to the specification. For example, the location 108 may be slightly larger than a prefab part and require a filler part. As such, the computer system 158 can select a 3D printer to print a new part according to the specification 114.

If material is removed, in 320, the prefab part is altered according to the specification. For example, the computer system 158 can instruct the autoloader 154 that matching the prefab part type in the specification 114. The computer system 158 can then translate the specification into instructions for the CNC tool 152. The computer system 158 can also include the labeler 156 to apply a visual indicator to the prefab part.

In 322, finishing can optionally be performed.

In 324, the altered prefab part is delivered to the construction site.

Figure 5A:
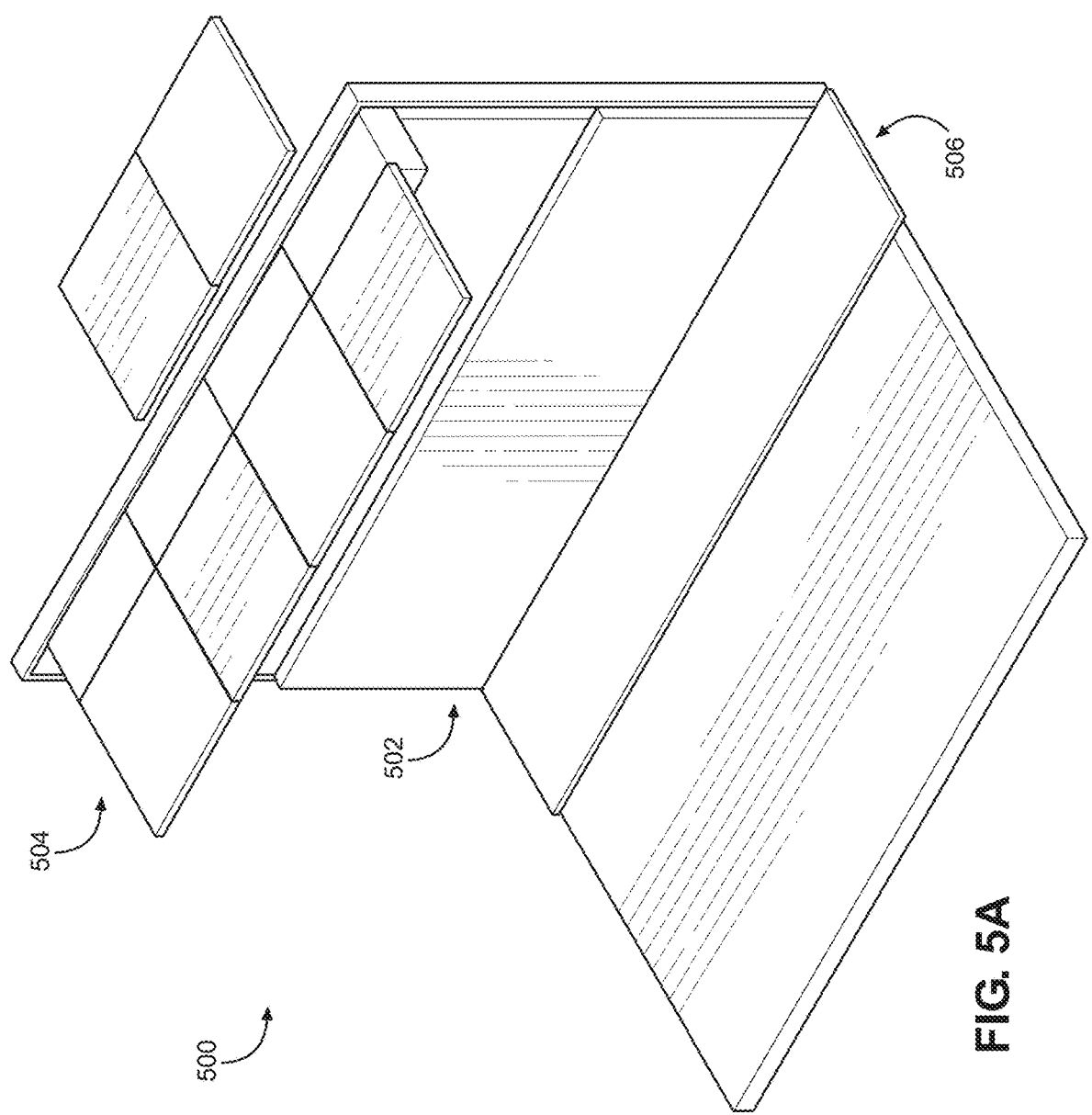

As discussed above, the custom part system can be utilized to determine and alter different types of prefab parts. FIG. 5A-5D illustrate several views of different types of prefab part that can be altered at a construction site 500, according to various implementations. As illustrated in FIG. 5A, the construction site 500 can be include prefab wall panel 502, prefab ceiling panels 504, and prefab floor panels 506. As illustrated in FIG. 5A-5D, the prefab wall panel 502, prefab ceiling panels 504, and prefab floor panels 506 can be manufactured as modular units that are installed using the installation assistance system and methods 200 and 300 described above. In the method 200 and 300 described above, the installation plan can include several three dimensional model of the construction site 500 similar to the views illustrated in FIG. 5A-5D.

Figure 6A:
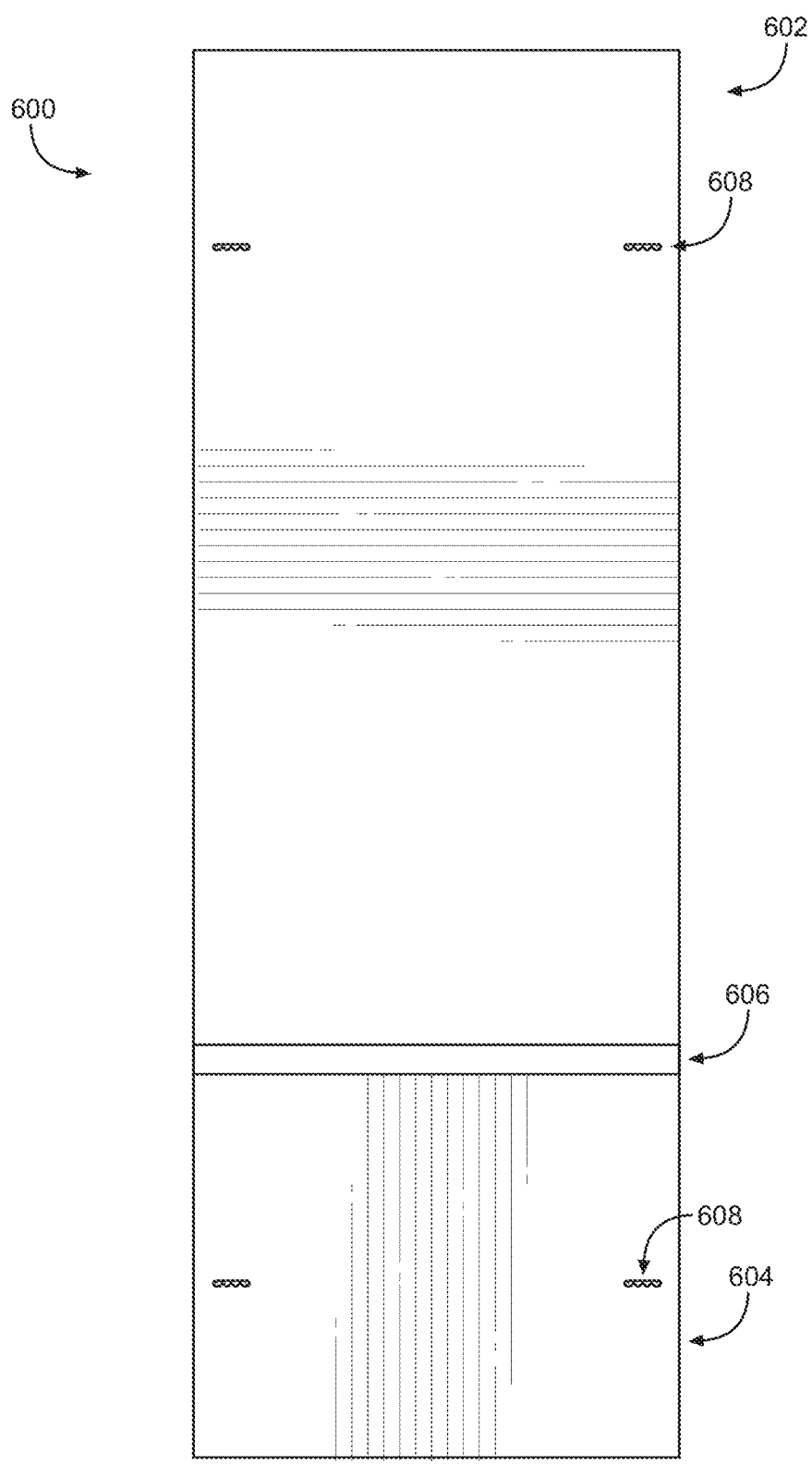
FIGS. 6A-6C illustrate an example of a prefab panel, according to various implementations.
Figure 6B:
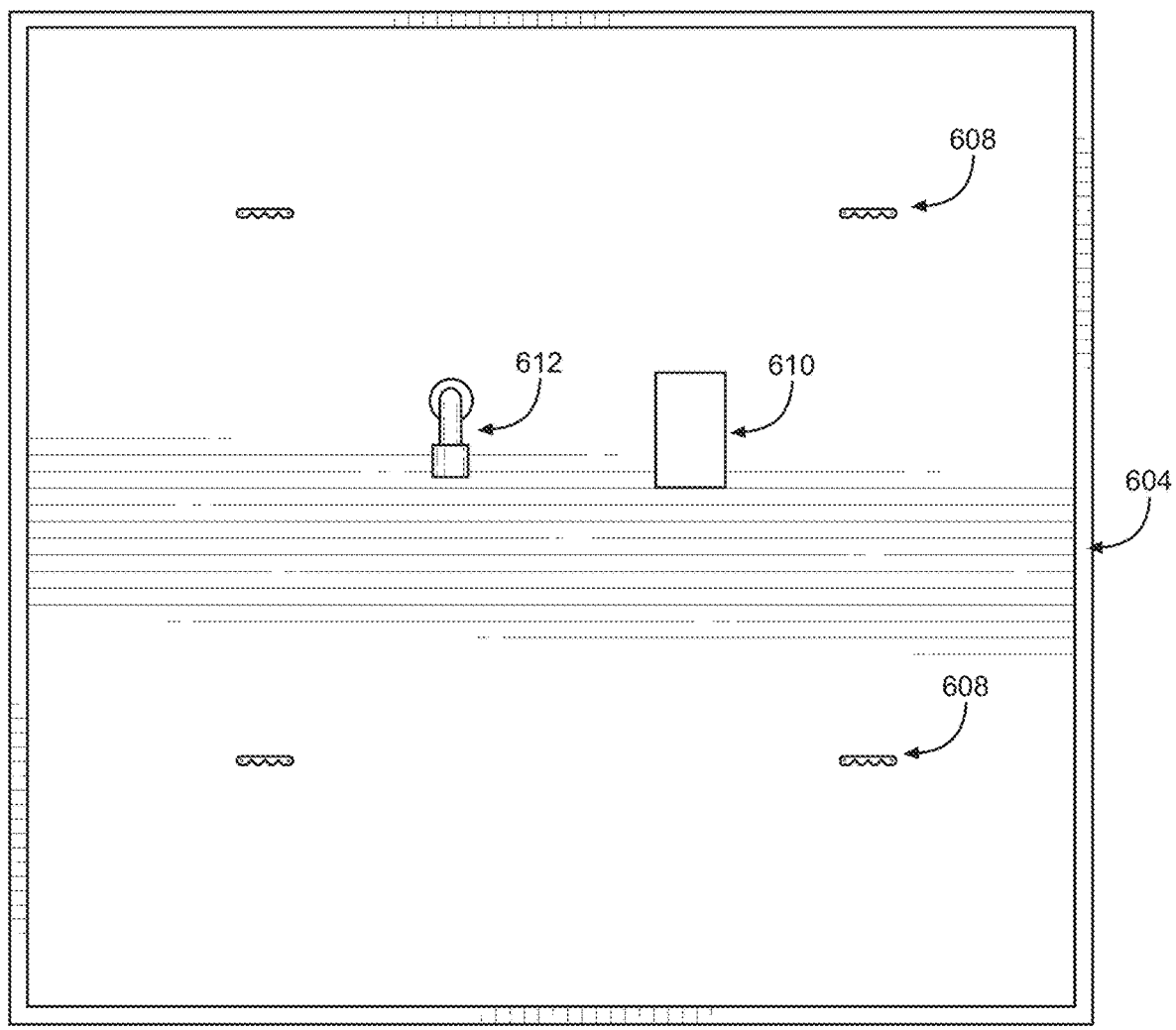
Figure 6C:
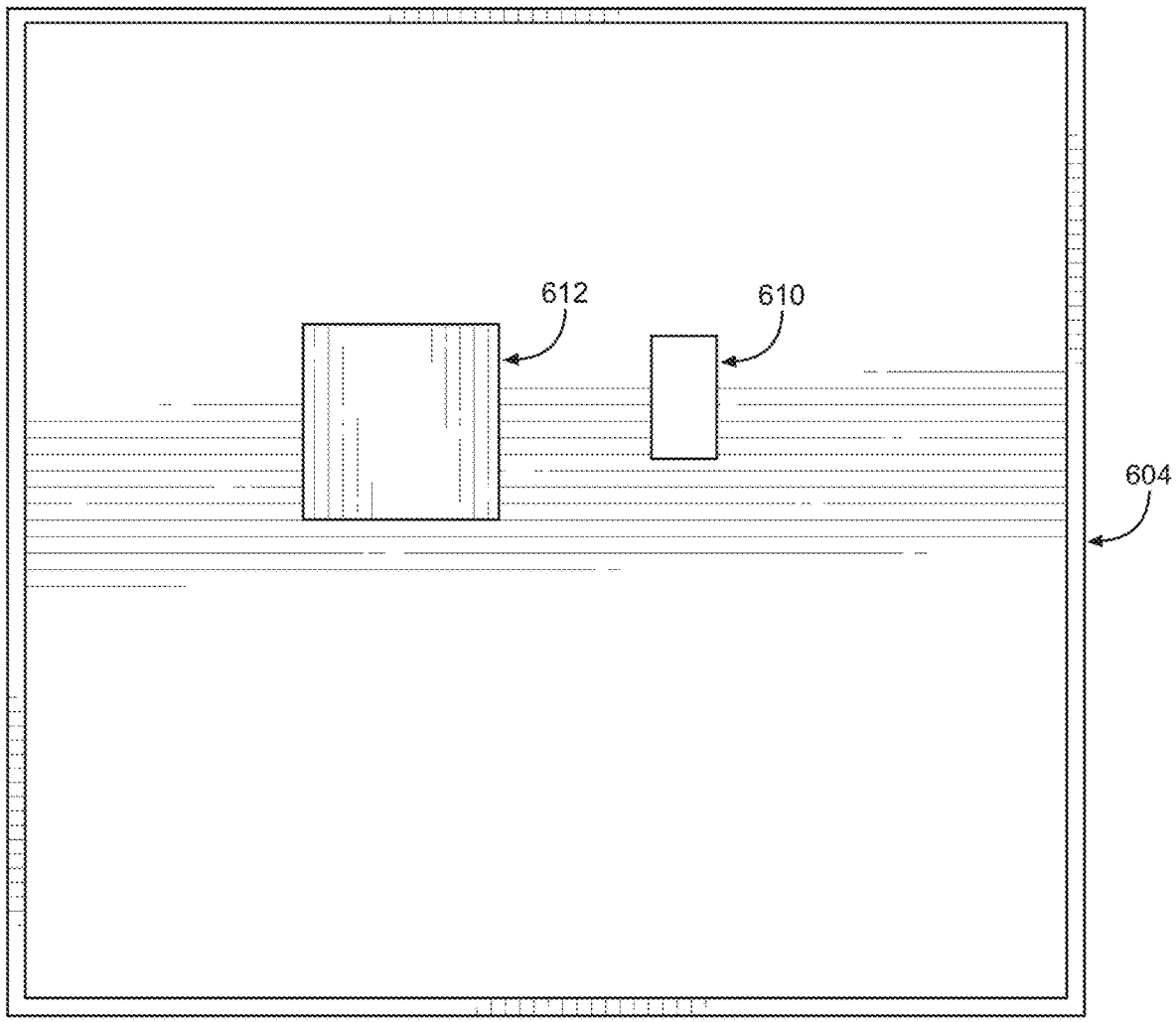

FIGS. 6A-6C illustrate an example of a prefab panel 600, which can be altered using the method described above, according to various implementations. FIG. 6A illustrates a rear view of the prefab panel 600. The prefab panel 600 includes a wall panel portion 602 and a base panel portion 604. The wall panel portion 602 can be connected to the base panel portion by a connecting strip 606. To install the prefab panel 600, the prefab panel 600 includes hangers 608. The hangers 608 are configured to engage with one or more rails installed on structural elements at a construction site. The prefab panel can be constructed of any type of construction material, e.g., wood, gypsum board, plater, paper, metal, plastics, and combination thereof. In some implementations, the hangers 608 can be located at a distance from the edge of the prefab panel 600 so that the prefab panel 600 can be altered without interfering with the hangers 608.

FIG. 6B illustrates a rear view of the base panel portion 604, and FIG. 6C illustrates a front view of the base panel portion 604. In addition to the hangers 608, the base panel portion 604 includes one or more premanufactured construction elements. For example, the base panel portion 604 can include an electrical knockout 610 and a plumbing knockout 612. The electrical knockout 610 is positioned at a location of electrical fixtures or components, such as an electrical outlets, switch outlets, wiring boxes, conduit, etc. The plumbing knockout 612 is positioned at a location of plumbing fixtures or components, such as a pipe location, faucet, drain, etc. One skilled in the art will also realize that the wall panel portion 602 can also include premanufactured construction elements.

Figure 5C:
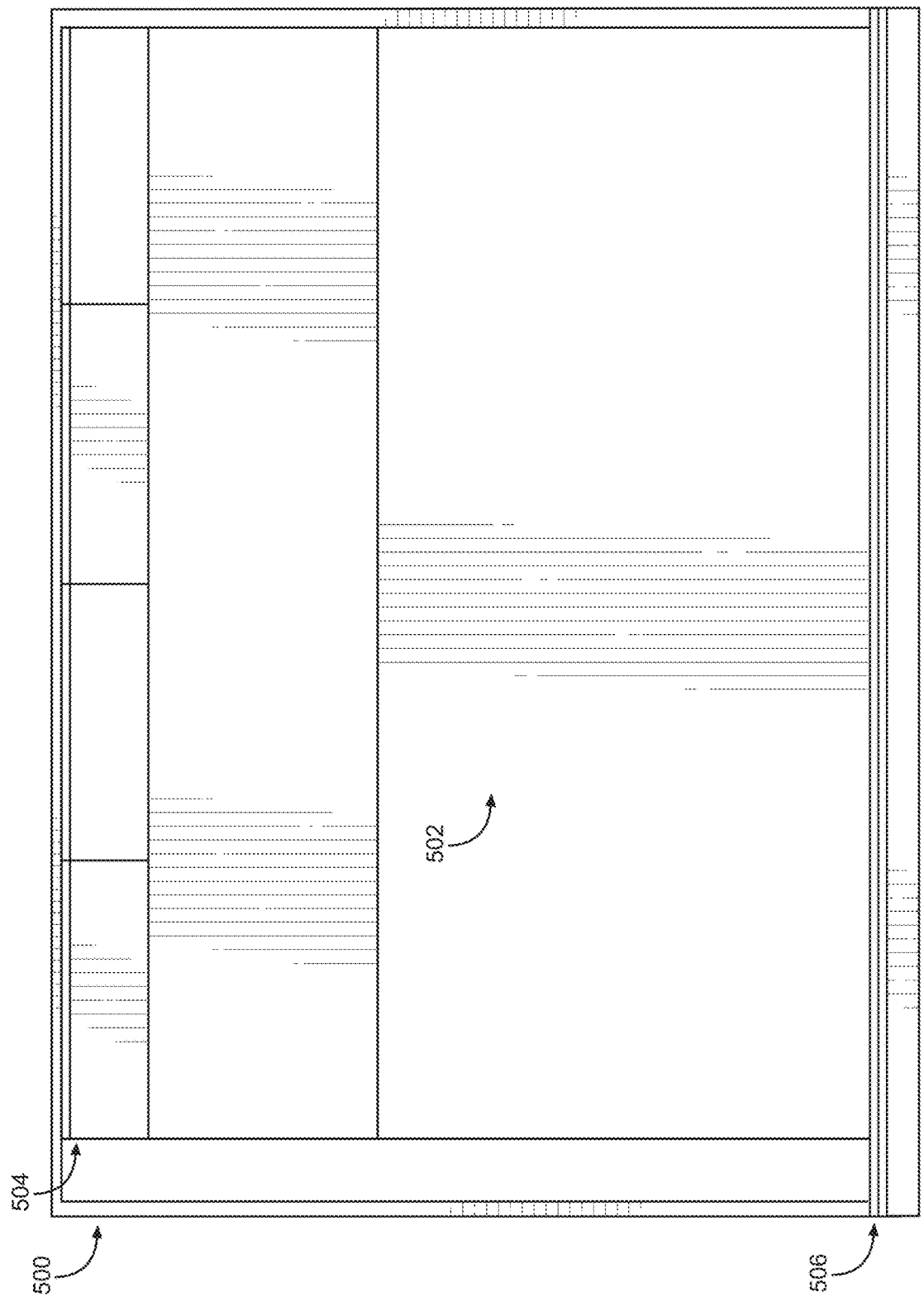
Figure 5D:
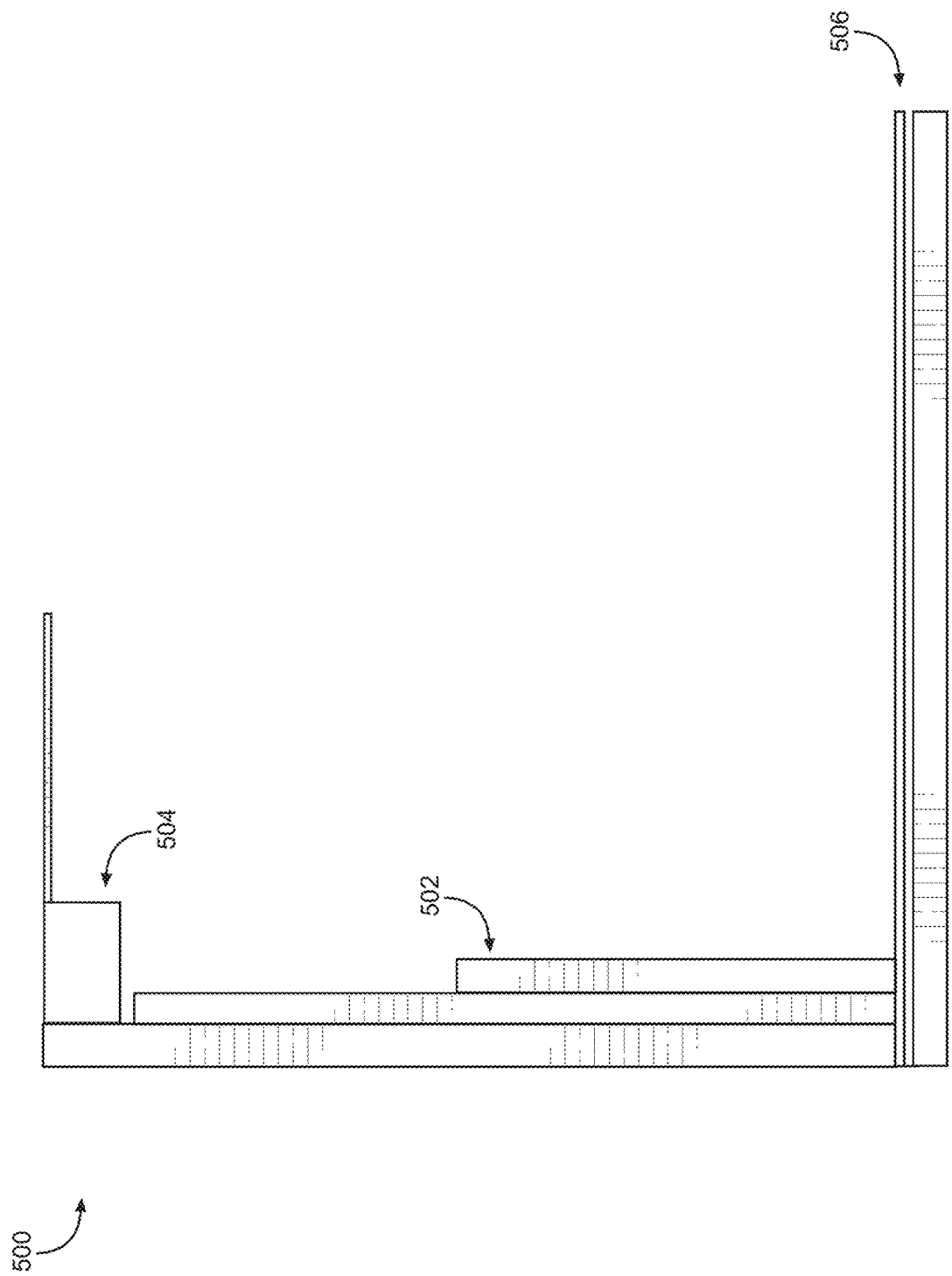
Figure 7A:
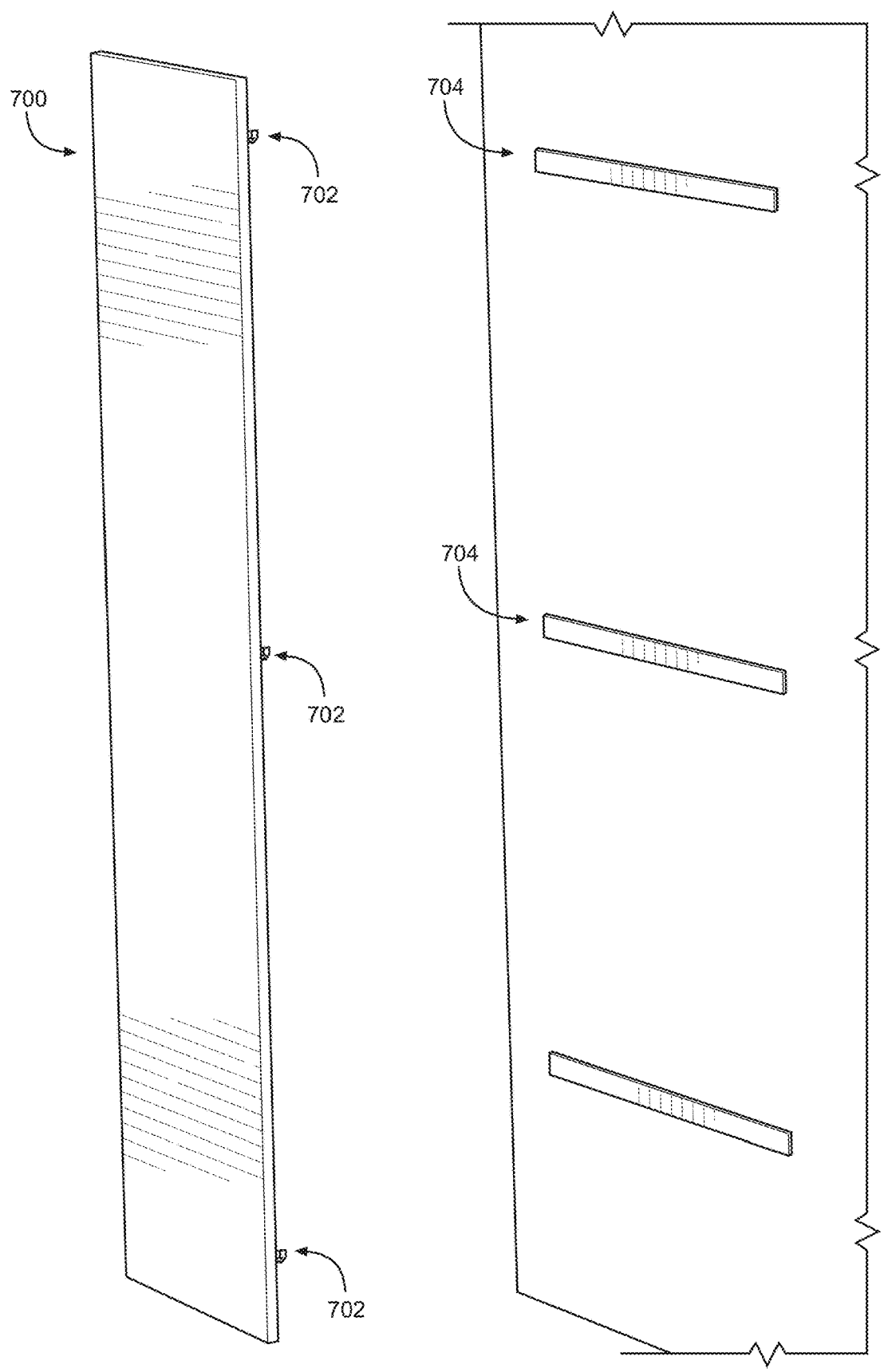
FIGS. 7A-7C illustrate an example of a method for installing a prefab panel, according to various implementations.
Figure 7B:
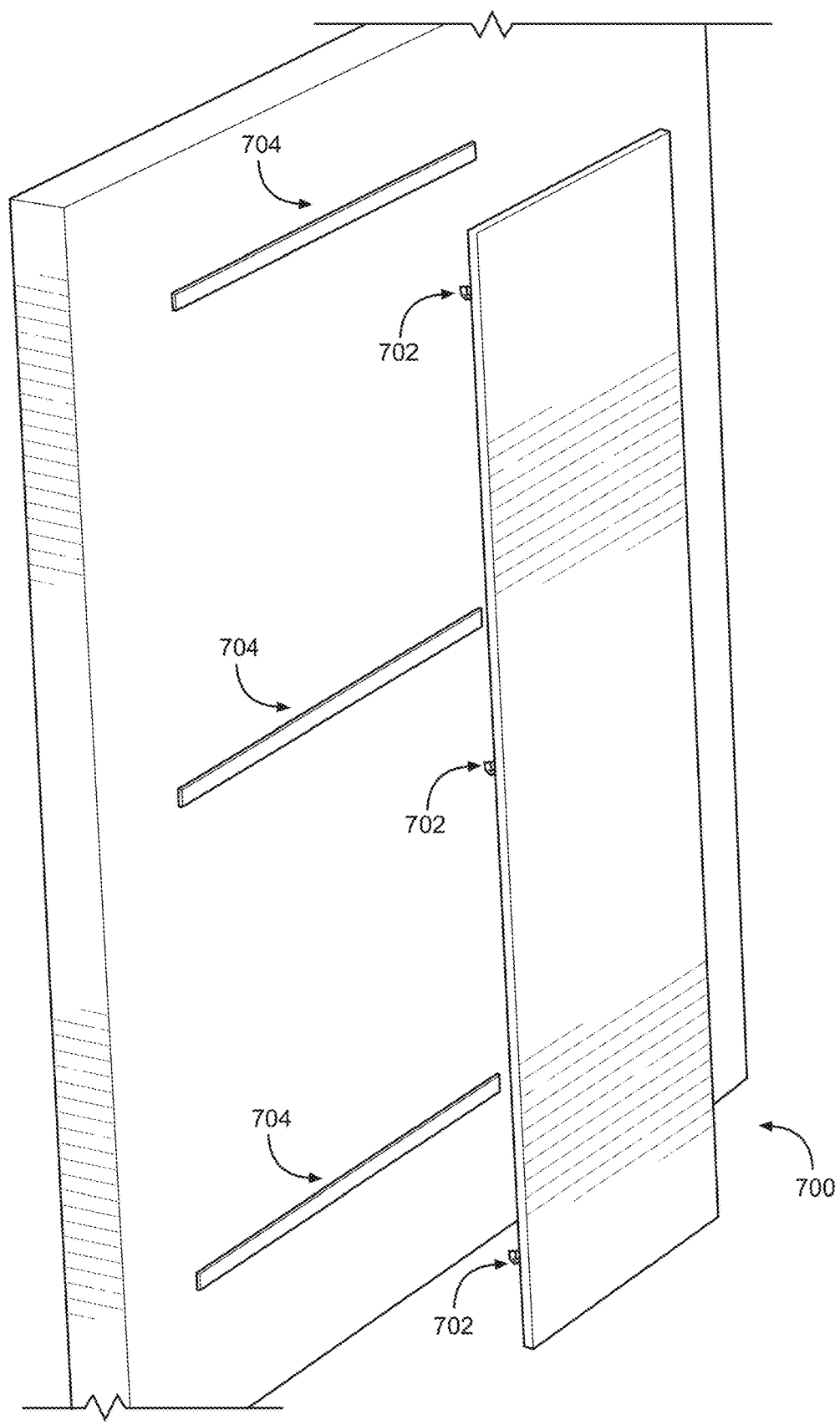
Figure 7C:
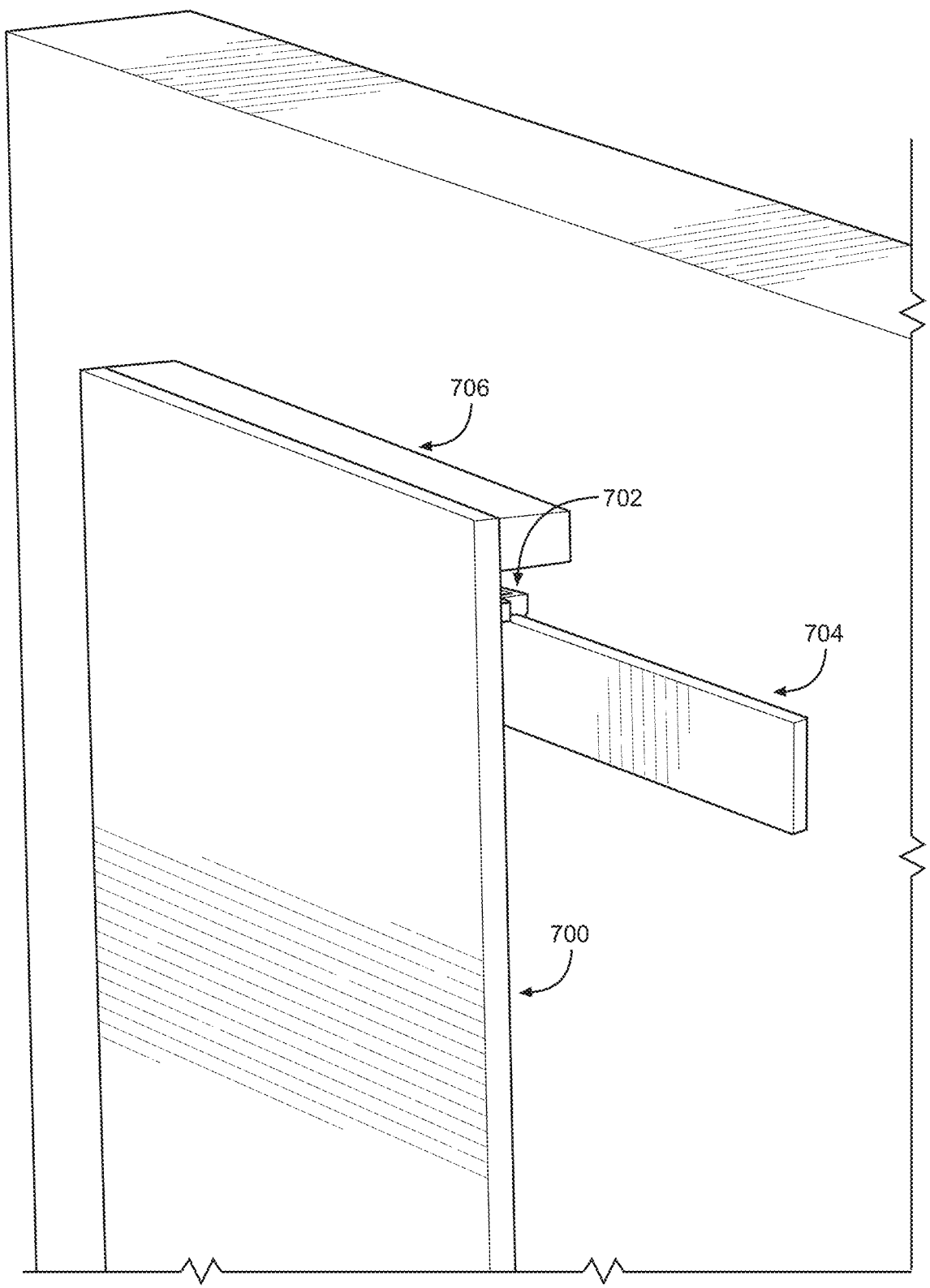

FIGS. 7A-7C illustrate an example of a method for installing a prefab panel 700, for example, prefab panel 600 described above. As illustrated in FIGS. 7A and 7B, the prefab panel 700 include one or more hangers 702 that are positioned to engage with one or more rails 704. The rails 504 include a lip that engages with the lip of the hangers 702. The rails 704 are affixed to a structural member (e.g., a wall). As illustrated in FIG. 5C, the prefab panel 700 are hung by lifting the prefab panel 700 to align the hangers 702 with the rails 704 and engaging the hangers 702 with the rails 704. The prefab panel 700 can also include a support member 706. The support member 706 provides support between the prefab panel 700 and the wall to prevent flex in the prefab panel 700.

An electrical and plumbing system can be altered at a construction site, according to various implementations. The electrical system can include various prefab parts, such as electrical wiring conduits, junction boxes, and fixtures. Likewise, the plumbing system can include various prefab parts, such as piping and fixture connectors. The prefab parts can be constructed to allow for a minimum amount of installation by a user. For example, the electrical wiring conduits and junction boxes can be preinstalled with wiring. In implementations, the custom part system can be utilized in the alteration and part of the electrical and plumbing system using the method described above.

Figure 8:
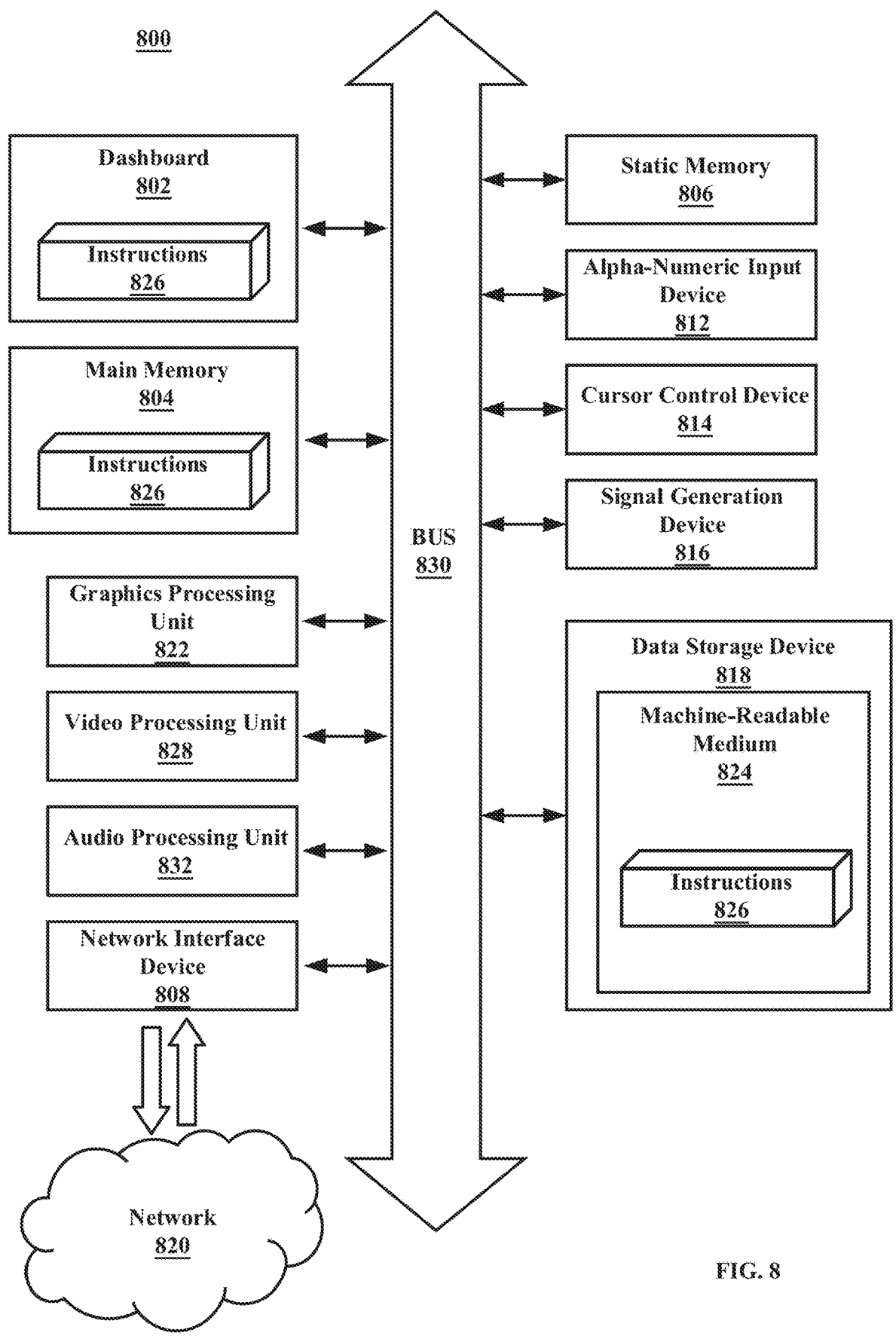
FIG. 8 illustrates an example of a computer system, according to various implementations.

FIG. 8 illustrates an example machine of a computer system within which a set of instructions, for causing the machine to perform any one or more of the methodologies discussed herein, can be executed. In implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" also includes any collection of machines that individually or jointly execute a set (or multiple sets) of instructions to perform any one or more of the methodologies discussed herein.

The computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

The processing device 802 represents one or more general-purpose processing devices such as a microprocessor, a central processing unit, or the like. For example, the processing device can be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system 800 further includes a network interface device 808 to communicate over the network 820. The computer system 800 also includes a video display unit 810 (e.g., a liquid crystal display (LCD) or a cathode ray tube (CRT)), an alphanumeric input device 812 (e.g., a keyboard), a cursor control device 815 (e.g., a mouse), a graphics processing unit 822, a signal generation device 816 (e.g., a speaker), graphics processing unit 822, video processing unit 828, and audio processing unit 832.

The data storage device 818 can include a machine-readable storage medium 824 (also known as a computer-readable medium) on which is stored one or more sets of instructions or software 826 embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media.

In implementations, the instructions 826 include instructions to implement functionality corresponding to the components of a device to perform the disclosure herein. While the machine-readable storage medium 824 is shown in an example implementation to be a single medium, the term "machine-readable storage medium" includes a single medium or multiple media (e.g., a centralized or distributed database, and/or associated caches and servers) that store the one or more sets of instructions. The term "machine-readable storage medium" also includes any medium that is capable of storing or encoding a set of instructions for execution by the machine and that cause the machine to perform any one or more of the methodologies of the present disclosure. The term "machine-readable storage medium" also includes, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "calculating" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

The present disclosure also relates to an apparatus for performing the operations herein. This apparatus can be specially constructed for the intended purposes, or it may comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), erasable programmable read-only memories (EPROMs), electrically erasable programmable read-only memories (EEPROMs), magnetic or optical cards, flash memory devices, or any type of media suitable for storing electronic instructions, each coupled to a computer system bus. Examples of implementations of the present disclosure can also be provided as a computer program product, or software, that may include a machine-readable medium having stored thereon instructions, which can be used to program a computer system (or other electronic devices) to perform a process according to the present disclosure.

Various general purpose systems can be used with programs in accordance with the teachings herein, or a more specialized apparatus can be utilized to perform the method. Examples of the structure for a variety of systems appear in the description above. In addition, the present disclosure is not described with reference to any particular programming language. It will be appreciated that a variety of programming languages may be used to implement the teachings of the disclosure as described herein.

A number of implementations have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps may be eliminated, from the described flows, and other components can be added to, or removed from, the described systems. Accordingly, other implementations are within the scope of the following claims.

What is claimed is:

1. A method for automatically manufacturing custom parts for use in a prefabricated construction site, the method comprising:
    scanning a room under construction;
    determining, based on the scan of the room, an image of an installation location in the room;
    calculating, based on the image of the installation location, alteration dimensions for a prefab part, wherein the alteration dimensions comprise alterations to the prefab part to match spatial dimensions of the installation location in the room;
    transmitting, via a network, the alteration dimensions to a factory, wherein the factory fabricates a custom prefab part according to the alteration dimensions;
    generating, via a manufacturing system at the factory, one or more custom prefab parts according to the alteration dimensions by removing material to reduce the size of a prefab part and adding material to increase the size of a prefab part; and
    applying, via the manufacturing system, a machine-readable label to one or more custom prefab parts, wherein the machine-readable label comprises information including at least installation order position, type of custom prefab part, and alterations made to the custom prefab part.

2. The method of claim 1, wherein scanning the room under construction comprises:
    illuminating the room with electromagnetic radiation; and
    sensing reflected components of the electromagnetic radiation that are reflected from surfaces within the room, wherein the surfaces comprise installed prefab parts and structural elements.

3. The method of claim 2, wherein the electromagnetic radiation comprises light.

4. The method of claim 2, the method further comprising:
    determining, based on the scan of the room, the installation location for installation of the prefab part, wherein determining the installation location comprises:
        determining, based on the scan, a first structural element, wherein the first structural element corresponds to a termination point for the installed prefab parts; and
        determining, based on the scan, at least one of the installed prefab parts positioned adjacent to the first structural element.

5. The method of claim 2, wherein calculating the alteration dimensions comprises:
    determining, based on the reflected components of the electromagnetic radiation, distances between a plurality of points on a first structural element and at least one installed prefab part; and
    calculating the alteration dimensions based on the distances between the plurality of points on the first structural element and the at least one installed prefab part.

6. The method of claim 5, wherein the alteration dimensions comprise one or more curves calculated based on the distances between the plurality of points on the first structural element and the at least one installed prefab part.

7. The method of claim 5, wherein the alteration dimensions comprise the spatial dimensions.

8. The method of claim 1, the method further comprising:
    converting, prior to transmitting to the factory, the alteration dimensions into an electronic design instructions that are readable by one or more machines of the factory.

9. The method of claim 8, wherein the electronic design instructions comprise one or more of instructions to remove material from the custom prefab part and instructions to add material to the custom prefab part.

10. The method of claim 1, wherein the alteration dimensions are within approximately 1% uncertainty of the spatial dimensions of the installation location.

11. A system for automatically manufacturing custom parts in a prefabricated construction site, the system comprising:
    one or more electromagnetic radiation sources configured to illuminate a room with electromagnetic radiation;
    one or more sensors configured to detect reflected components of the electromagnetic radiation that are reflected from surfaces within the room, wherein the surfaces comprise installed prefab parts and structural elements in the room; and
    a processing unit coupled to the one or more electromagnetic radiation sources and the one or more sensors, the processing unit executing instructions for performing a method comprising:
        scanning a room under construction with the one or more electromagnetic radiation sources and the one or more sensors;
        determining, based on the reflected components of the electromagnetic radiation, an image of an installation location in the room;
        calculating, based on the image of the installation location, alteration dimensions for a prefab part, wherein the alteration dimensions comprise alterations to the prefab part to match spatial dimensions of the installation location in the room;
        transmitting, via a network, the alteration dimensions to a factory, wherein the factory fabricates a custom prefab part according to the alteration dimensions;
        generating, via a manufacturing system at the factory, one or more custom prefab parts according to the alteration dimensions by removing material to reduce the size of a prefab part and adding material to increase the size of a prefab part; and
        applying, via the manufacturing system, a machine-readable label to one or more custom prefab parts, wherein the machine-readable label comprises information including at least installation order position, type of custom prefab part, and alterations made to the custom prefab part.

12. The system of claim 11, wherein scanning the room under construction comprises:
    illuminating the room with electromagnetic radiation; and
    sensing the reflected components of the electromagnetic radiation, wherein the surfaces comprise installed prefab parts and structural elements.

13. The system of claim 12, wherein the electromagnetic radiation comprises light.

14. The system of claim 12, the processing unit executing the instructions for performing the method further comprising:
- determining, based on the reflected components of the electromagnetic radiation, the installation location for installation of the prefab part, wherein determining the installation location comprises:
  - determining, based on the reflected components of the electromagnetic radiation, a first structural element, wherein the first structural element corresponds to a termination point for the installed prefab parts; and
  - determining, based on the reflected components of the electromagnetic radiation, at least one of the installed prefab parts positioned adjacent to the first structural element.

15. The system of claim 12, wherein calculating the alteration dimensions comprises:
- determining, based on the reflected components of the electromagnetic radiation, distances between a plurality of points on a first structural element and at least one installed prefab part; and
- calculating the alteration dimensions based on the distances between the plurality of points on the first structural element and the at least one installed prefab part.

16. The system of claim 15, wherein the alteration dimensions comprise one or more curves calculated based on the distances between the plurality of points on the first structural element and the at least one installed prefab part.

17. The system of claim 15, wherein the alteration dimensions comprise the spatial dimensions.

18. The system of claim 11, the processing unit executing the instructions for performing the method further comprising:
- converting, prior to transmitting to the factory, the alteration dimensions into an electronic design instructions that are readable by one or more machines of the factory.

19. The system of claim 18, wherein the electronic design instructions comprise one or more of instructions to remove material from the custom prefab part and instructions to add material to the custom prefab part.

20. The system of claim 11, wherein the alteration dimensions are within approximately 1% uncertainty of the spatial dimensions of the installation location.

21. The method of claim 1, wherein the machine-readable label is in the form of a barcode, quick response ("QR") code, or radio frequency identifier ("RFID").

22. The system of claim 11, wherein the machine-readable label is in the form of a barcode, quick response ("QR") code, or radio frequency identifier ("RFID").

* * * * *